United States Patent [19]

Hussblein et al.

[11] Patent Number: 5,102,242
[45] Date of Patent: Apr. 7, 1992

[54] ROLLER BEARING FOR SUPPORTING SHAFTS WITH LIMITED AXIAL MOVEMENT

[75] Inventors: Wolfgang Hussblein, Gerolzhofen; Wilhelm Meyer, Reichmannshausen; Gunter Neder, Schweinfurt; Willi Wassen, Schwalmtal, all of Fed. Rep. of Germany

[73] Assignee: SKF GmbH, Schweinfurt, Fed. Rep. of Germany

[21] Appl. No.: 664,936

[22] Filed: Mar. 5, 1991

[30] Foreign Application Priority Data

Mar. 12, 1990 [DE] Fed. Rep. of Germany ....... 4007775

[51] Int. Cl.⁵ .................. F16C 33/46; F16C 33/58
[52] U.S. Cl. .................... 384/523; 384/516; 384/526
[58] Field of Search ............... 384/495–497, 384/513–516, 523, 526, 572, 49, 51; 464/145

[56] References Cited

U.S. PATENT DOCUMENTS 2,105,976  1/1938  Langlois ..................... 384/513 X
3,975,066  8/1976  Hofmann et al. ............. 384/526
4,720,197  1/1988  Scharting et al. ............ 384/51 X
4,723,851  2/1988  Troster et al. .............. 384/523
4,944,642  7/1990  Andersson .................. 384/516 X

FOREIGN PATENT DOCUMENTS 2648985  5/1978  Fed. Rep. of Germany ...... 384/572
2608234  6/1988  France ........................ 384/477

Primary Examiner—Thomas R. Hannon
Attorney, Agent, or Firm—Eugene E. Renz, Jr.

[57] ABSTRACT

Roller bearing for supporting members with limited axial movement, consisting of bearing elements having confronting raceways and a plurality of rolling elements held in a cage between the raceways. One of the raceways is bounded by flanges defining contact surfaces. At least one end surface of the cage (3) has elastic segments (9), radially oriented sections (10) of which engage in a groove (11) in one of the bearing elements. In the terminal axial positions of the one bearing element (2) relative to the other bearing element (1), the radially oriented sections (10) of the cage (3) rest against the lateral surfaces (13) of the groove (11).

3 Claims, 1 Drawing Sheet

ROLLER BEARING FOR SUPPORTING SHAFTS WITH LIMITED AXIAL MOVEMENT

FIELD OF THE INVENTION

The present invention relates to improvements in roller bearings for supporting shafts or the like with limited axial movement.

BACKGROUND OF THE INVENTION

Roller bearings of the type to which the present invention relate typically comprise bearing elements or the like having cylindrical or flat raceways and a plurality of rolling elements held in a cage between the raceways wherein at least one of the raceways is bounded by flanges which preferably have slanted contact surfaces. A roller bearing of this type is shown, for example, in West German Registered Design No. 72-12,720. In this roller bearing assembly, the rolling elements strike the flanges of one of the bearing elements when the shaft or the like moves in an axial direction which can produce damage to the rolling elements.

SUMMARY OF THE INVENTION

With the foregoing in mind, it is an object of the present invention to provide an improvement in roller bearings of the type described above wherein damage to the rolling elements in the terminal axial positions of one bearing element relative to the other bearing element is avoided. To this end, in accordance with the present invention, at least one surface of the cage is provided with elastic segments having radially oriented sections which engage in a groove in one bearing element and/or in the other bearing element. The elastic segments are oriented in such a manner that when the bearing elements are in their terminal axial positions with respect to one another, the radially oriented sections of the cage rest against the lateral surfaces of the groove. By reason of this design, the desired goal to absorb elastically relative axial movements of the bearing elements in the terminal positions is realized. In accordance with the roller bearing assembly of the present invention, the roller elements engage softly against the lateral surfaces of the groove and thus are absorbed elastically.

BRIEF DESCRIPTION OF THE DRAWINGS

These and other objects of the present invention and the various features and details of the operation and construction thereof are hereinafter more fully set forth with reference to the accompanying drawing, wherein.

DETAILED DESCRIPTION OF THE PREFERRED EMBODIMENT

Figure 1:
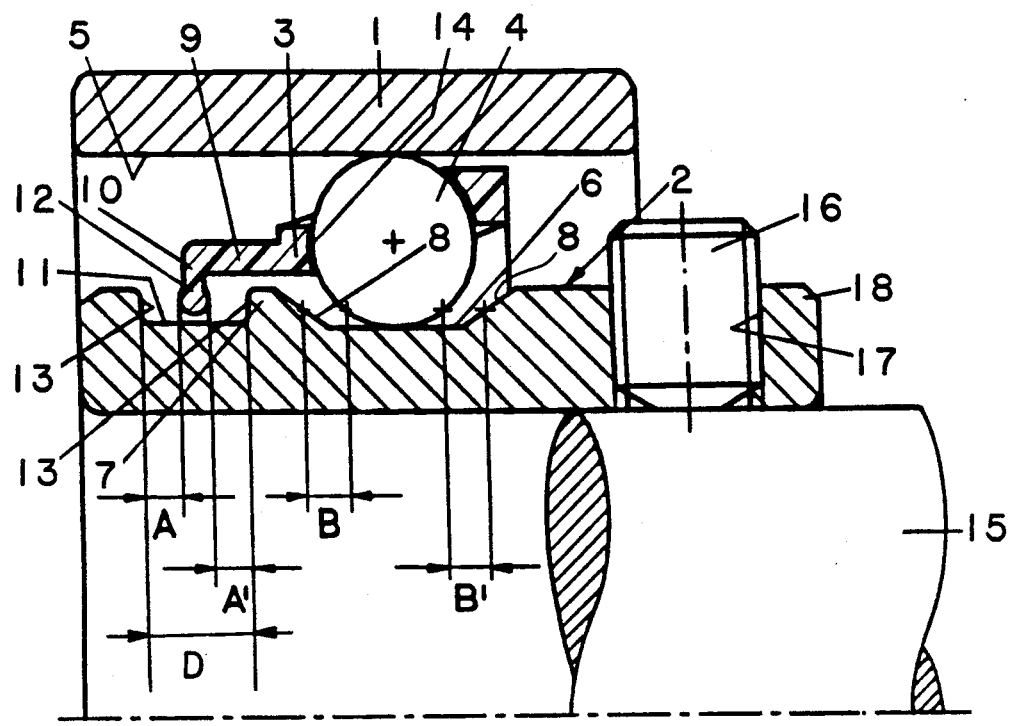
FIG. 1 is a transverse sectional view of a bearing constructed in accordance with the present invention.
Figure 2:
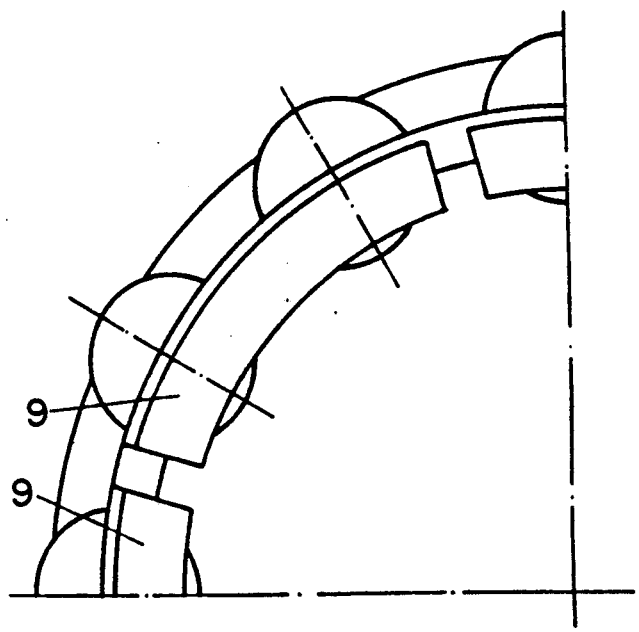
FIG. 2 is a fragmentary side view of the cage shown in FIG. 1.

Referring now to the drawing an particularly to FIG. 1 thereof, there is illustrated a so called "change bearing" incorporating the improvements of the present invention which consists generally of an outer ring 1, an inner ring 2, and a plurality of balls 4 supported in circumferentially spaced relation which engage in the annular space between the raceways of the inner and outer rings. The outer ring 1 is provided with a cylindrical raceway 5 for the balls 4 and the inner ring 2 has a cylindrical raceway 6 bounded by flanges 7 having slanted contact surfaces 8.

In accordance with the present invention, cage 3 has elastic segments 9 formed at least on one end surface. The elastic segments 9 have radially inwardly directed sections 10 which engage in an annular groove 11 in the lateral surface of inner ring 2 and determine the axial movement of the set of balls in both axial directions. Thus, in the axial terminal positions of the inner ring relative to the outer ring, a bead 12 of the radially oriented sections 10 of the cage 3 rests against radially lateral surface 13 of annular groove 11. To this end, the distance D between the lateral surfaces 13 is greater than the thickness T of the transverse dimension of the bead 12. The combination of the distances A and A' is smaller than the combination of the distances B and B' between the surfaces of the balls and in this manner axial displacements of the inner ring 2 relative to the outer ring in the terminal or outer positions are absorbed elastically by the cage bead engaging the lateral surfaces and the balls 4 are not damaged when they run up against the slanted surface 8. Balls 4 are held in pockets 14 of cage 3 so that they do not fall out when the outer ring is removed. The bearing is mounted on a shaft 15 by means of a threaded pin 16 which is installed in a threaded hole 17 and an extension 18 of inner ring 2.

Even though a particular form of "change bearing" has been illustrated and described herein, it is not intended to limit the invention and changes and modifications may be made therein within the scope of the following claims. For example, the lateral surface of the inner ring can be cylindrical and a cylindrical bore surface can be provided in the bore of the outer ring. The outer ring bore surface may be bounded by flanges with slanted contact surfaces and the radially outwardly directed sections of the elastic segments engage in an annular groove of the bore in the outer ring. Further, the elastic segments 9 can also be installed on end surfaces of the cage and engage in grooves in either the one or the other bearing element. Additionally, a shaft or the like can also serve as a bearing element.

What is claimed is:

1. Roller bearing for supporting members with limited axial movement, consisting of bearing elements adapted for limited axial movement relative to one another between terminal axial limit positions, said bearing elements having confronting raceways and a plurality of rolling elements supported in a cage between the raceways, one of said raceways being bounded by flanges defining contact surfaces (8), characterized in that at least one end surface of the cage (3) has elastic segments (9) having radially oriented sections (10) which engage in a groove (11) having lateral surfaces in one of the bearing elements and wherein the radially oriented sections (10) of the cage (3) rest against the lateral surfaces (13) of the groove (11) when the bearing elements are disposed at said terminal axial limit positions.

2. Roller bearing according to claim 1, characterized in that the axial distance between the lateral surfaces (13) of the groove (11) are smaller than the distance between the contact surfaces (8) of the raceway.

3. Roller bearing according to claim 1, including a bead (12) located on the outer free terminal end of the elastic segment (9).

* * * * *

UNITED STATES PATENT AND TRADEMARK OFFICE
CERTIFICATE OF CORRECTION

PATENT NO. : 5,102,242

DATED : April 7, 1992

INVENTOR(S) : Hublien et al

It is certified that error appears in the above-identified patent and that said Letters Patent is hereby corrected as shown below:

Title Page:

In item [19] delete "Hussblein et al" and insert --Hublien et al--.

In item [75] Inventors: delete "Wolfgang Hussblein" and insert --Wolfgang Hublien--.

Signed and Sealed this

Twenty-eighth Day of September, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,102,242
DATED : April 7, 1992
INVENTOR(S) : Wolfgang Husslein

It is certified that error appears in the above-indentified patent and that said Letters Patent is hereby corrected as shown below:

Title Page:

In item [19] delete "Hussblein et al" and insert --Husslein et al--.

In item [75] Inventors: delete "Wolfgang Hussblein" and insert --Wolfgang Husslein--.

This certificate supersedes the Certificate of Correction issued on September 28, 1993.

Signed and Sealed this

First Day of February, 1994

Attest:

BRUCE LEHMAN

*Attesting Officer*        *Commissioner of Patents and Trademarks*